(12) United States Patent
Yoo et al.

(10) Patent No.: US 11,049,091 B2
(45) Date of Patent: Jun. 29, 2021

(54) PAYMENT INFORMATION-BASED GEOFENCING METHOD AND DEVICE THEREFOR

(71) Applicant: Samsung Electronics Co., Ltd., Suwon-si (KR)

(72) Inventors: Seungmin Yoo, Suwon-si (KR); Chaiman Lim, Suwon-si (KR); Songyean Cho, Suwon-si (KR); Daeho Kang, Suwon-si (KR); Yeunwoong Kyung, Suwon-si (KR); Seonik Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/968,993

(22) PCT Filed: Feb. 19, 2019

(86) PCT No.: PCT/KR2019/001955
§ 371 (c)(1),
(2) Date: Aug. 11, 2020

(87) PCT Pub. No.: WO2019/164210
PCT Pub. Date: Aug. 29, 2019

(65) Prior Publication Data
US 2021/0027271 A1    Jan. 28, 2021

(30) Foreign Application Priority Data

Feb. 21, 2018 (KR) .................. 10-2018-0020766

(51) Int. Cl.
*G06Q 20/32* (2012.01)
*G06Q 20/40* (2012.01)
(Continued)

(52) U.S. Cl.
CPC ....... *G06Q 20/3224* (2013.01); *G06Q 20/204* (2013.01); *G06Q 20/3255* (2013.01);
(Continued)

(58) Field of Classification Search
CPC ................. G06Q 20/3224; G06Q 20/4015
See application file for complete search history.

(56) References Cited

U.S. PATENT DOCUMENTS

| 9,646,318 B2 | 5/2017 | McGavran et al. |
| 10,034,151 B2 | 7/2018 | Yang et al. |

(Continued)

FOREIGN PATENT DOCUMENTS

| KR | 10-2016-0029896 A | 3/2016 |
| KR | 10-2016-0069279 A | 6/2016 |

(Continued)

*Primary Examiner* — A. Hunter Wilder
(74) *Attorney, Agent, or Firm* — Jefferson IP Law, LLP

(57) ABSTRACT

Disclosed is an electronic device comprising at least one communication circuit, a display and a processor. The processor of the electronic device may be configured so as to: receive information associated with a payment from a first external electronic device; generate, from the information associated with a payment, payment information including at least the name of a store associated with the payment; acquire at least one wireless network information; and transmit the at least one wireless network information and the payment information to a second external electronic device. In addition, various embodiments are possible as identified in the specification.

13 Claims, 10 Drawing Sheets

(51) Int. Cl.
  *G06Q 20/20*   (2012.01)
  *G06Q 20/38*   (2012.01)
  *H04L 29/08*   (2006.01)
  *H04W 4/021*   (2018.01)
  *H04W 4/14*    (2009.01)
  *H04W 48/16*   (2009.01)

(52) U.S. Cl.
  CPC ....... *G06Q 20/3278* (2013.01); *G06Q 20/383* (2013.01); *G06Q 20/4015* (2020.05); *H04L 67/26* (2013.01); *H04W 4/021* (2013.01); *H04W 4/14* (2013.01); *H04W 48/16* (2013.01)

(56)    References Cited

U.S. PATENT DOCUMENTS

| | | |
|---|---|---|
| 10,070,253 B2 | 9/2018 | Kang |
| 2015/0237470 A1 | 8/2015 | Mayor et al. |
| 2015/0345969 A1 | 12/2015 | McGavran et al. |
| 2016/0165417 A1 | 6/2016 | Yang et al. |
| 2016/0295372 A1 | 10/2016 | Kapicioglu et al. |
| 2017/0188188 A1 | 6/2017 | Kang |
| 2017/0364901 A1* | 12/2017 | Chandrasekaran ............ G06Q 20/3224 |
| 2018/0121913 A1* | 5/2018 | Unnerstall ......... G06Q 20/3224 |
| 2018/0295564 A1* | 10/2018 | Madan ............... G06Q 20/3224 |

FOREIGN PATENT DOCUMENTS

| | | |
|---|---|---|
| KR | 10-2017-0034121 A | 3/2017 |
| KR | 10-2017-0078116 A | 7/2017 |
| KR | 10-2017-0099353 A | 8/2017 |

\* cited by examiner

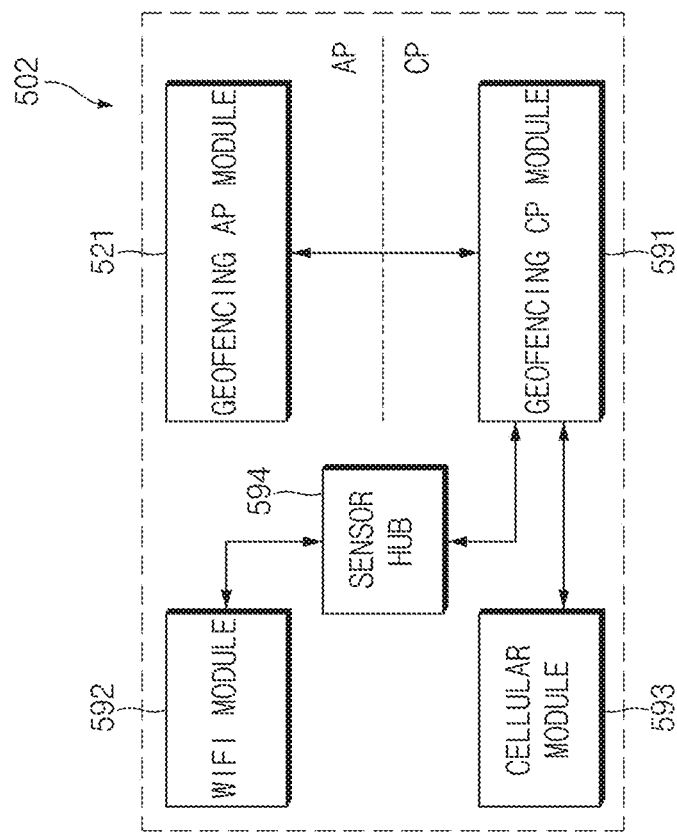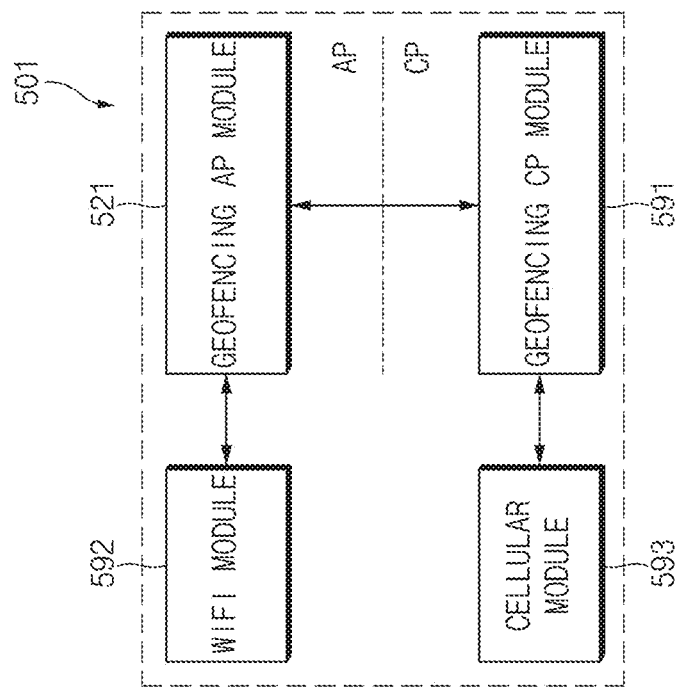
FIG.5

PAYMENT INFORMATION-BASED GEOFENCING METHOD AND DEVICE THEREFOR

TECHNICAL FIELD

Embodiments disclosed in this specification relate to a geofencing method based on payment information and an electronic device therefor.

BACKGROUND ART

Various location-based services have been provided depending on the distribution of mobile devices capable of recognizing a location, such as a smartphone. For example, when a mobile device is located to be adjacent to a specific store, services or advertisements associated with the store may be provided to the mobile device. To provide such the location-based service, it is necessary to define the geographic boundary of a specific place (e.g., a store). For example, when a user crosses a certain boundary, the user may be provided with a notification associated with the corresponding location, thereby improving a user experience. This boundary may be set as a virtual boundary associated with a real place. For example, a geofencing method may be used. A geofence may be a virtual parameter for a real-world geographical area dynamically generated around a geographical location such as a store.

DISCLOSURE

Technical Problem

In the conventional geofencing scheme, a geofence may be defined based on latitude and longitude that are capable of being obtained by a global positioning system (GPS). However, it may be difficult to perform GPS-based positioning indoors. For example, when a plurality of stores are located in one building, it may be difficult to provide an appropriate notification to a user through GPS-based geofencing.

To supplement the limitations of location-based services based on GPS, the geofencing based on various indoor positioning methods has been studied. For example, indoor positioning based on Bluetooth may be performed. However, in this case, there is a need for a separate device (e.g., a beacon) for indoor positioning, and each geofence may need to be defined by a person. For another example, the geofencing based on a wireless fingerprint may be performed.

Technical Solution

According to an embodiment disclosed in the disclosure, an electronic device may include at least one communication circuit, a display, and a processor controlling the at least one communication circuit and the display. The processor may be configured to receive information associated with a payment from a first external electronic device, to generate payment information at least including a store name associated with the payment, from the information associated with the payment, to obtain at least one wireless network information, using the at least one communication circuit, and to transmit the obtained at least one wireless network information and the payment information to a second external electronic device.

Furthermore, according to an embodiment disclosed in the disclosure, a data transmitting method of an electronic device may include receiving information associated with a payment from a first external electronic device, generating payment information at least including a store name associated with the payment, from the information associated with the payment, obtaining at least one wireless network information associated with the electronic device, and transmitting the obtained at least one wireless network information and the payment information to a second external electronic device.

Moreover, according to an embodiment disclosed in the disclosure, an electronic device may include at least one wireless communication circuit, a near-distance communication circuit for performing a transaction with a point-of-service (POS) device, a global positioning system (GPS) sensor, a processor operatively connected to the at least one wireless communication circuit, the near-distance communication circuit, and the GPS sensor, and a memory operatively connected to the processor. The memory may store instructions that, when executed, cause the processor to perform a transaction with the POS device, using a short-range communication circuit, to receive a message associated with the transaction from an external server, to determine whether the transaction is an offline transaction or an online transaction, to extract POS information from the message when the transaction is an offline transaction, to determine a location, using at least one of the at least one wireless communication circuit and the GPS sensor, and to transmit the POS information and the location to the external server.

Advantageous Effects

According to various embodiments disclosed in the specification, positioning accuracy may be improved using wireless signal information and payment information.

According to various embodiments, accurate geofence may be generated based on location information and payment information received from a plurality of electronic devices.

Besides, a variety of effects directly or indirectly understood through the disclosure may be provided.

DESCRIPTION OF DRAWINGS

FIG. 5 is a block diagram of a geofencing module according to various embodiments.

With regard to description of drawings, the same or similar components may be marked by the same or similar reference numerals.

MODE FOR INVENTION

Hereinafter, various embodiments of this specification may be described with reference to accompanying drawings. Embodiments and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference marks/numerals.

Figure 1:
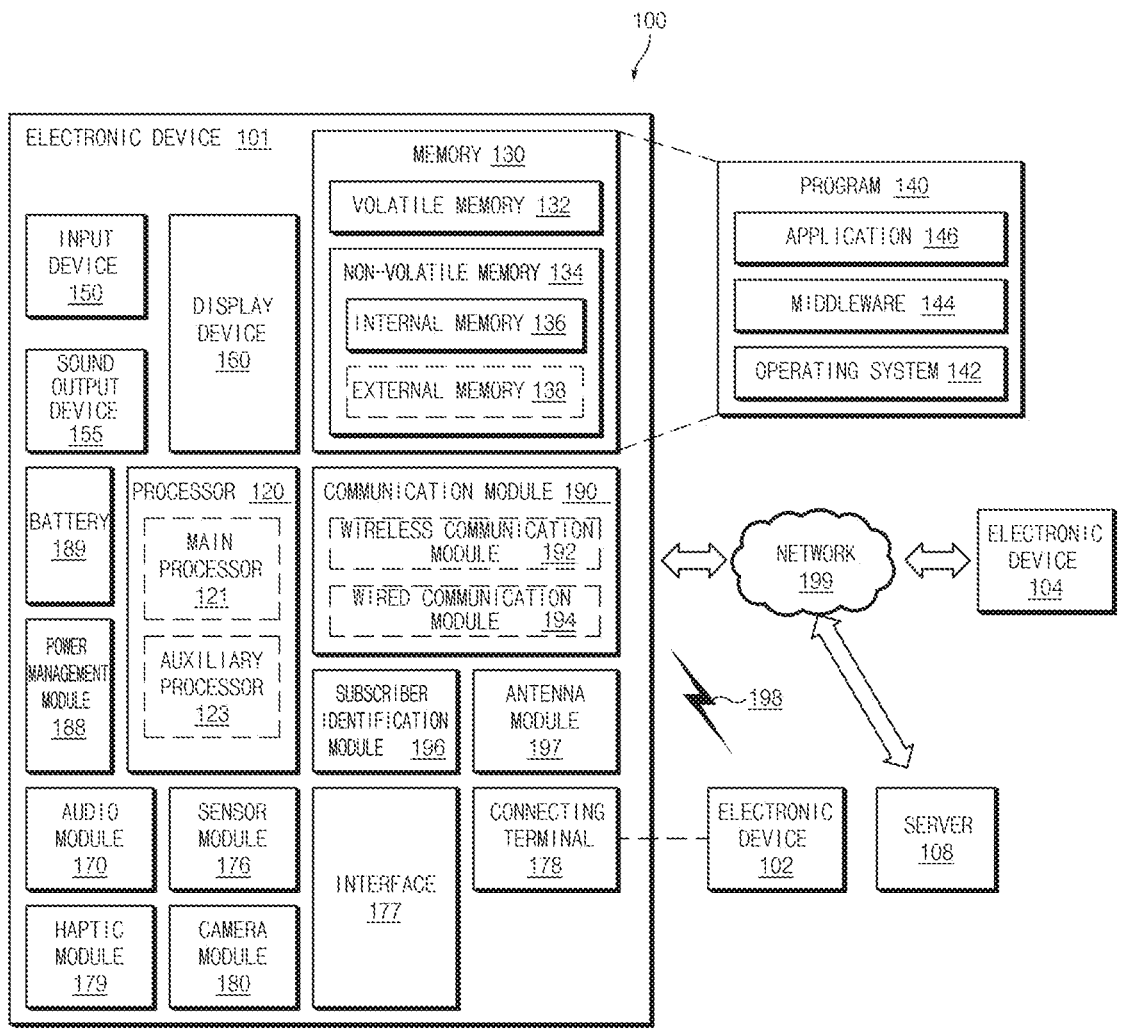
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In various embodiments to be described below, the operations of the electronic device 101 may be performed by the processor 120. For example, the processor 120 may control the operations of the electronic device 101 based on instructions stored in the memory 130.

Figure 2:
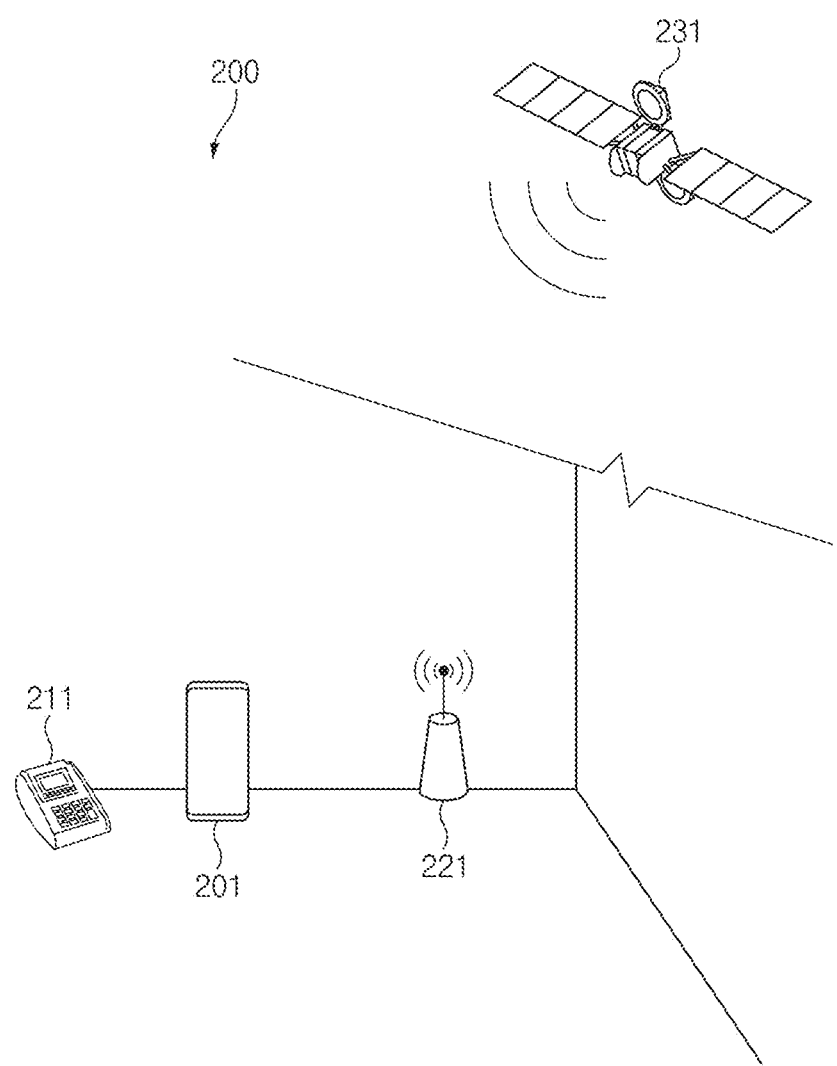
FIG. 2 illustrates a positioning environment of an electronic device according to an embodiment.

FIG. 2 illustrates a positioning environment 200 of an electronic device according to an embodiment.

Referring to FIG. 2, the electronic device 101 may perform positioning, using a signal received from a satellite 231. For example, the electronic device 101 may perform positioning, using GPS. However, as illustrated in FIG. 2, when the electronic device 101 is positioned indoors, GPS-based positioning may fail to be performed or positioning performance may be degraded.

According to an embodiment, interest location information associated with wireless fingerprint may be used. The electronic device 101 may obtain wireless network information and payment information for more accurate geofencing based on wireless network information. For example, the wireless network information may include at least one of location information obtained from a cellular network, WiFi scanning information, Bluetooth-based positioning information, and/or ultra-wideband (UWB)-based positioning information. Hereinafter, examples for obtaining each of pieces of information will be described.

According to an embodiment, the electronic device 101 may obtain geographic information (e.g., latitude and longitude) of the electronic device 101 from at least one base station of a cellular network. For example, the electronic device 101 may receive information about the location of the electronic device 101 from a single base station. For another example, the electronic device 101 may obtain information about the location of the electronic device 101 based on signals received from a plurality of base stations. The electronic device 101 may obtain or estimate information about the location of the electronic device 101 based on the locations of the plurality of base stations and the strength of the received signal. For still another example, the electronic device 101 may obtain geographic information from a service provider of a cellular network.

According to an embodiment, the electronic device 101 may perform positioning based on short-range communication such as Bluetooth or UWB. For example, the electronic device 101 may obtain location information of the electronic device 101 by performing positioning using at least one algorithm, using at least one of time difference of arrival (TDoA), time of flight (ToF), angle of departure (AoD), angle of arrival (AoA), and/or time stamping.

According to an embodiment, the electronic device 101 may use location information obtained from a global navigation satellite system (GNSS). For example, the GNSS may include at least one of a global positioning system (GPS), a Galileo system, a Glonass system, or a Beidou system. Hereinafter, for convenience of description, various embodiments based on GPS will be described. According to various embodiments, GPS may be referred to as an arbitrary means for obtaining location information. For example, the term GPS may be referred to as a term GNSS.

According to an embodiment, the electronic device 101 may obtain wireless network information (e.g., WiFi network information) through communication with an external electronic device 221. For example, the external electronic device 221 may be an access point of a WiFi network or a beacon. According to an embodiment, the electronic device 101 may obtain WiFi network information based on a signal received from the external electronic device 221. The electronic device 101 may obtain WiFi network information by performing WiFi scanning. For example, the electronic device 101 may perform WiFi scanning by receiving a broadcasting signal including information associated with the access point from the WiFi access point. For another example, the electronic device 101 may perform WiFi scanning by transmitting a probe request through each WiFi channel and receiving a response from the WiFi access point. The electronic device 101 may perform WiFi scanning on all channels, but may selectively perform WiFi scanning on only some channels.

According to an embodiment, WiFi network information may include identification information (e.g., service set identification (SSID) and/or basic service set identification (BSSID)), received signal strength (e.g., received signal strength indication (RSSI)), and/or information about channel (e.g., channel index) of the external electronic device 221.

According to an embodiment, the electronic device 101 may provide a payment service to a point of sales (POS) terminal 211. For example, the electronic device 101 may transmit an electromagnetic signal including information for payment to the POS terminal 211. Besides, the electronic device 101 may receive payment information from a payment server (not illustrated). For example, the payment information may include a name of a payment store, a payment amount, and/or information (e.g., at least part of a card number, or the like) associated with a payment means.

Figure 3:
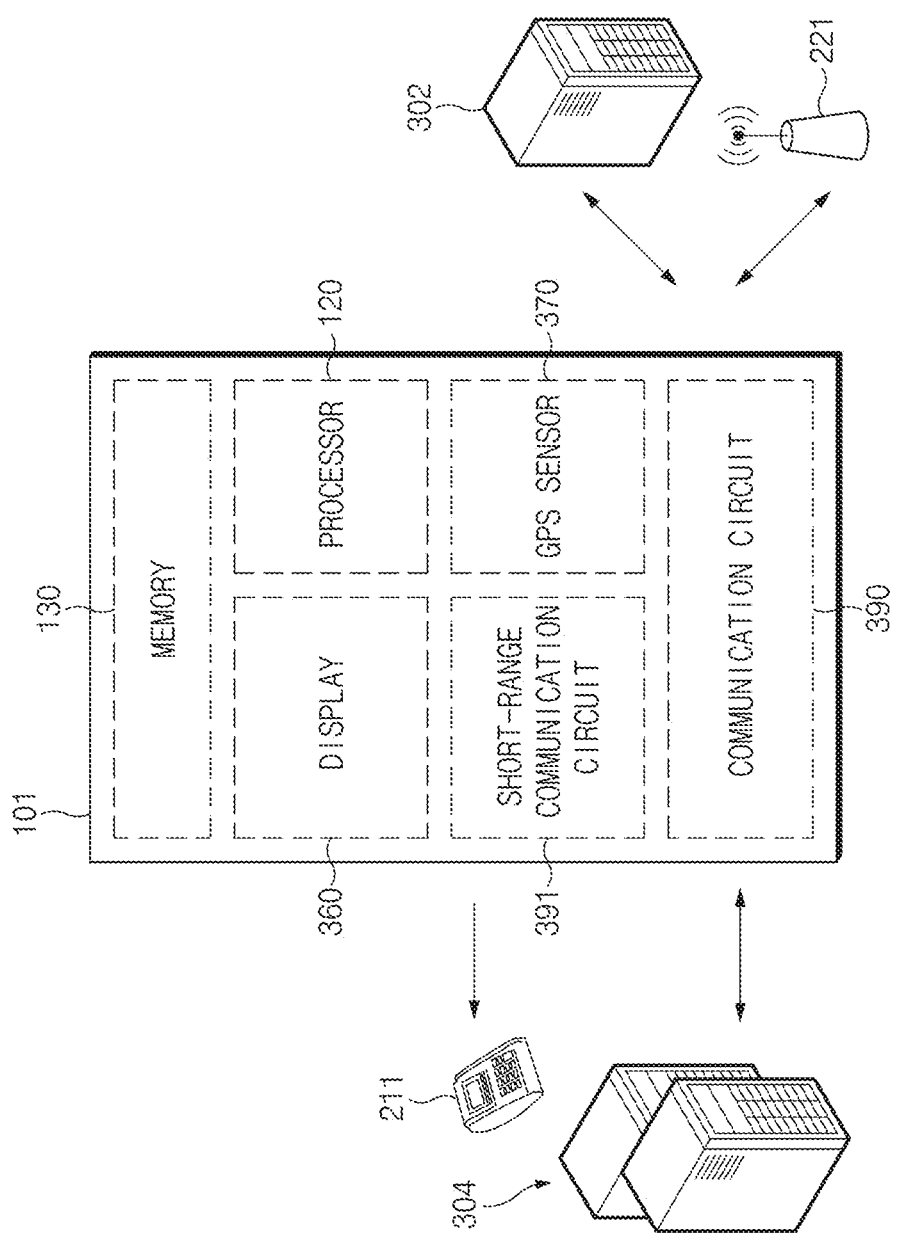
FIG. 3 illustrates a configuration of an electronic device in various positioning environments.

FIG. 3 illustrates an example of a configuration of the electronic device 101 in various positioning environments 300.

Referring to FIG. 3, according to an embodiment, the electronic device 101 may include at least one of the processor 120, the memory 130, a communication circuit 390 (e.g., the communication module 190 in FIG. 1), a short-range communication circuit 391 (e.g., the communication module 190 of FIG. 1), a GPS sensor (e.g., the communication module 190 of FIG. 1) or a display 360 (e.g., the display device 160 of FIG. 1).

According to various embodiments, the processor 120 may be operatively connected to the memory 130, the communication circuit 390, the short-range communication circuit 391, the GPS sensor 370, and/or the display 360, and may control the operations of the electronic device 101 and the configurations of the electronic device 101.

According to various embodiments, the memory 130 may be operatively connected to the processor 120 and may store instructions for controlling the processor 120. According to an embodiment, the memory 130 may store instructions for causing the processor 120 to perform the operations of the processor 120 or the electronic device 101 to be described.

According to various embodiments, the communication circuit 390 may provide the communication with a first external electronic device (e.g., geofencing server) 302, a second external electronic device (e.g., an access point) 221, and a third external electronic device (e.g., a payment server) 304, over a network. According to an embodiment, the communication circuit 390 may provide the communication with the first external electronic device 302 and/or the third external electronic device 304 over any network (e.g., WiFi network, local area network (LAN), wide area network (WAN), cellular network, or the like) having an Internet access. According to an embodiment, the communication circuit 390 may communicate with the second external electronic device 221 based on the WiFi protocol.

According to various embodiments, the short-range communication circuit 391 may be configured to make a transaction with the POS terminal 211. According to an embodiment, the short-range communication circuit 391 may generate an electromagnetic signal for transmitting the payment information to the POS terminal 211. According to an embodiment, the short-range communication circuit 391 may be configured to transmit the payment information to the POS terminal 211, using a signal based on at least one of magnetic secure transmission (MST) or near field communication (NFC). For example, the processor 120 may transmit the payment information to the POS terminal 211, simultaneously using MST and NFC to increase the recognition rate. For example, when failing to make a MST-based payment, the processor 120 may be configured to transmit a signal for NFC-based payment.

According to various embodiments, the GPS sensor 370 may be configured to obtain the location of the electronic device 101 based on a satellite signal. For example, the GPS sensor 370 may obtain information on the location of the electronic device 101 based on GNSS.

According to various embodiments, at least one of the communication circuit 390, the short-range communication circuit 391, or the GPS sensor 370 may be implemented as one or more circuits (e.g., chips). For example, the communication circuit 390 and the short-range communication circuit 391 may be referred to as at least one communication circuit. For example, the communication circuit 390, the short-range communication circuit 391, and the GPS sensor 370 may be referred to as at least one communication circuit. For example, the communication circuit 390 and the GPS sensor 370 may be referred to as at least one communication circuit.

According to various embodiments, the processor 120 of the electronic device 101 may be configured to receive information associated with a payment from the third external electronic device 304, to generate payment information at least including a store name (e.g., POS information) associated with a payment from information associated with payment, to obtain at least one wireless network information, using at least one communication circuit (e.g., the communication circuit 390), and to transmit at least one wireless network information and the payment information to the first external electronic device 302. For example, the information associated with a payment may include payment approval information. For example, the payment approval information may be a push message or a short message service (SMS) message. According to an embodiment, the payment approval information may include at least one of information (e.g., a user name and/or card number) associated with user identification, information (e.g., a store name) associated with the POS terminal 211, card issuer information, a payment amount, a payment date, a payment time, or a payment item.

According to an embodiment, when information associated with a payment is received, the processor 120 may be configured to obtain at least one wireless network information.

According to an embodiment, when a payment based on NFC or MST is made, the processor 120 may be configured to obtain at least one wireless network information.

According to an embodiment, the processor 120 may be configured to generate the payment information by excluding information capable of identifying a user of the electronic device 101 or a payment means associated with the payment from information associated with the payment. For example, the information capable of identifying the user may include at least one of a user's name, information of a payment means (e.g., a credit card owned by the user) associated with the user, or a telephone number of the electronic device 101 of the user. For example, information capable of including the payment means (e.g., a credit card) may include at least one of at least part of an identification number (e.g., card number) of the payment means, the name of a card issuer, card validation code (CVC), or an expiration date.

According to an embodiment, the processor 120 may be configured to receive information related to the payment from the third external electronic device 304, using at least one of a push notification, a push message, a short message service (SMS), or a multimedia message service (MMS).

For example, the at least one wireless network information may include at least one of a network identifier, signal reception strength, channel information, or location information received from a network.

According to an embodiment, the processor 120 may be configured to obtain the at least one wireless network information by performing wireless scanning. For example, the processor 120 may perform wireless scanning, using the communication circuit 390.

According to an embodiment, the processor 120 may be configured to receive interest location information from the first external electronic device 302, using at least one communication circuit (e.g., the communication circuit 390), and to execute at least one application based on the location associated with the interest location information by comparing the interest location information with the wireless network information. For example, the processor 120 may be configured to execute a specific application corresponding to a store associated with the interest location information. For example, the specific application may be an application that provides location-based content. For example, the specific application may include a membership application or an advertisement providing application of a store.

According to an embodiment, the interest location information may include an identifier based on a store name and at least one wireless fingerprint associated with the identifier.

According to an embodiment, the at least one wireless fingerprint may include a network identifier, average received signal strength information, and/or variance information of received signal strength.

According to various embodiments, a data transmitting method of the electronic device 101 may include receiving information associated with a payment from the third external electronic device 304, generating payment information at least including a store name associated with the payment, from the information associated with the payment, obtaining at least one wireless network information associated with the electronic device, and transmitting the obtained at least one wireless network information and the payment information to the first external electronic device 302.

According to an embodiment, the electronic device 101 may perform the obtaining of the at least one wireless network information in response to reception of the information associated with the payment.

According to an embodiment, the data transmitting method may further include making the payment, using NFC or MST. The obtaining of the at least one wireless network information may be performed in response to the payment using the NFC or the MST.

According to an embodiment, the generating of the payment information may include excluding information capable of identifying a user of the electronic device 101 or a payment means associated with the payment from the information associated with the payment.

According to an embodiment, the receiving of the information associated with the payment may include receiving the information associated with the payment from the third external electronic device 304, using at least one of a push notification, a push message, an SMS, or an MMS.

According to an embodiment, the at least one wireless network information may include at least one of a network identifier, signal reception strength, channel information, or location information received from a network.

According to an embodiment, the obtaining of the at least one wireless network information may include obtaining the at least one wireless network information by performing wireless scanning.

According to an embodiment, the data transmitting method may further include receiving interest location information from the first external electronic device 302 and executing at least one application based on the location associated with the interest location information by comparing the interest location information with the wireless network information.

According to an embodiment, the interest location information may include an identifier based on a store name and at least one wireless fingerprint associated with the identifier.

According to an embodiment, the at least one wireless fingerprint may include a network identifier, average received signal strength information, and variance information of received signal strength.

According to various embodiments, the memory 130 may store instructions that cause the processor 120 to perform a transaction with the POS device 211, using a short-range communication circuit 391, to receive a message associated with the transaction from an external server (e.g., the third external electronic device 304), to determine whether the transaction is an offline transaction or an online transaction, to extract POS information from the message when the transaction is an offline transaction, to determine a location, using at least one of at least one wireless communication circuit (e.g., the communication circuit 390) and the GPS sensor 370, and to transmit the POS information and the location to the external server (e.g., the first external electronic device 302). For example, the message associated with the transaction may be a message including information associated with the above-described payment. For example, the message associated with the transaction may include at least one of a push message or an SMS message.

According to an embodiment, the memory 130 may further store at least one instruction that, when executed, causes the processor 120 to determine the transaction as the offline transaction when the transaction is performed based on NFC or MST.

According to an embodiment, the memory 130 may further store at least one instruction that, when executed, causes the processor 120 to determine the location by performing scanning on at least one wireless network using the at least one wireless communication circuit (e.g., the communication circuit 390).

According to an embodiment, the memory 130 may further store at least one instruction that, when executed, causes the processor 120 to transmit at least one of a network identifier, signal reception strength, channel information, or location information, which is associated with the scanned wireless network, to the external server (e.g., the first external electronic device 302).

According to an embodiment, the POS information may include store name information associated with the transaction.

In the following embodiments, the term "payment" may be referred to as a "transaction". For example, payment information and information associated with a payment may be referred to as transaction information and information associated with a transaction.

Figure 4:
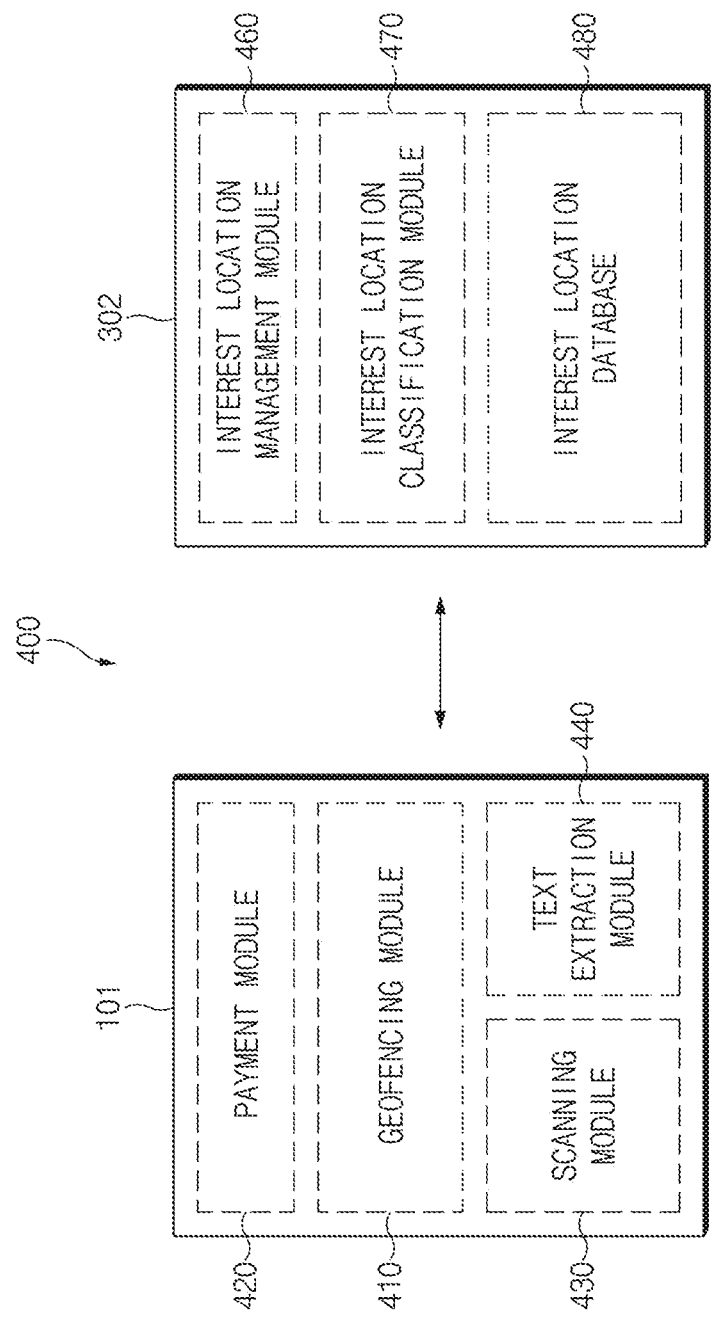
FIG. 4 is a block diagram of an electronic device and a geofencing server according to various embodiments.

FIG. 4 is a block diagram 400 of an electronic device and a geofencing server according to various embodiments.

Referring to FIG. 4, according to an embodiment, when payment information is received from a payment server (e.g., the third external electronic device 304 in FIG. 3), the electronic device 101 may perform wireless scanning (e.g., WiFi scanning). According to an embodiment, the electronic device 101 may transmit information including at least part of the payment information and at least part of the result of wireless scanning to the geofencing server (e.g., the first external electronic device 302 in FIG. 3). According to an embodiment, the electronic device 101 may transmit, to the geofencing server 302, at least part of the payment information, at least part of the wireless scanning information, and location information based on a cellular network or GPS.

According to various embodiments, the geofencing server 302 may generate an interest location based on information received from the electronic device 101. According to an embodiment, the geofencing server 302 may generate an interest location by combining the payment information and the wireless network information (e.g., the wireless scanning result), which are received from the electronic device 101. According to an embodiment, the geofencing server 302 may generate the interest location by combining the wireless network information, the payment information, and the location information, which are received from the electronic device 101. For example, the geofencing server 302 may obtain information (e.g., a store name) of a place (e.g., a store) associated with the payment from the payment information received from the electronic device 301, and may generate wireless fingerprint of the corresponding place, using the wireless scanning information. For example, the geofencing server 302 may perform automated geofencing based on crowd sourcing, by receiving information from a plurality of user devices (e.g., the electronic device 101). According to an embodiment, the geofencing server 302 may transmit information about the generated interest location to the electronic device 101, and the electronic device 101 may provide a user with a location-based service based at least on the information about the received interest location.

According to various embodiments, the electronic device 101 may include at least one of a geofencing module 410, a payment module 420, a scanning module 430, or a text extraction module 440. According to an embodiment, the geofencing server 302 may include at least one of an interest location management module 460, an interest location classification module 470, or an interest location database 480.

The configurations of the electronic device 101 and the geofencing server 302 illustrated in FIG. 4 are exemplary and may be implemented with hardware and/or software modules. According to an embodiment, the electronic device 101 and/or the geofencing server 302 may further include configurations not illustrated in FIG. 4 or may not include at least part of the configurations illustrated in FIG. 4. For example, the electronic device 101 may not include the text extraction module 440. The operations by the configurations of the electronic device 101 and the geofencing server 302 described below may be performed by a processor.

According to an embodiment, the payment module 420 of the electronic device 101 may store and manage information about the payment means (e.g., a credit card). The payment module 420 may perform operations for making a payment through the electronic device 101 instead of the payment means. When the electronic device 101 makes a payment, the payment module 420 may make a request for a payment to a payment server (e.g., the third external electronic device 304 in FIG. 3); when information (e.g., payment authorization statement) indicating payment authorization is received from the payment server 304, the payment module 420 may display the payment result on the display 360.

According to an embodiment, the electronic device 101 may detect a payment; when payment is detected, the electronic device 101 may deliver the payment authorization statement to the geofencing module 410. For example, when the payment authorization statement is received, the payment module 420 may deliver the payment authorization statement to the geofencing module 410. For example, the electronic device 101 may detect a payment based on the execution or process of the payment application. For example, the electronic device 101 may detect a payment based on a user input (e.g., the use of Gifticon) for a specific program.

According to an embodiment, the payment module 420 may deliver only the part of the payment authorization statement to the geofencing module 410. For example, to protect personal information, the payment module 420 may also deliver, to the geofencing module 410, the remaining information (e.g., a store name, a payment amount, a payment date, or the like) other than information associated with user identification (e.g., a card number, or the like) in the payment authorization statement.

According to an embodiment, the payment module 420 may deliver the payment authorization statement to the geofencing module 410 based on whether an offline payment is made. For example, the payment module 420 may distinguish whether a payment is an online payment or offline payment, and may deliver the payment authorization statement to the geofencing module 410 only when the payment is an offline payment. The reason is that there is no substantial relationship in the geographic location between the online payment and the corresponding payment. For example, the offline payment may mean that the electronic device 101 and a payment terminal (e.g., the POS terminal 211) make a payment, using a short-range wireless communication (e.g., NFC or MST).

The geofencing module 410 may manage a location-based service in the electronic device 101 based on the communication with the geofencing server 302. According to an embodiment, when payment information (e.g., at least part of the payment authorization statement) is received from the payment module 420, the geofencing module 410 may make a request for wireless scanning to the scanning module 430 and may receive the wireless scanning result from the scanning module 430. According to an embodiment, the geofencing module 410 may transmit, to the geofencing server 302, the wireless scanning result and the wireless network information (e.g., WiFi network information) including payment information. Table 1 below is an example of wireless network information capable of being transmitting to the geofencing server 302 by the geofencing module 410.

TABLE 1

| Latitude/longitude | WiFi network information | | |
|---|---|---|---|
| | BSSID | RSSI | CHANNEL INDEX |
| 37.6/126.9 | AA:BB:CC:11:22:33 | −60 dBm | 41 |
| | AA:BB:CC:77:88:99 | −72 dBm | 56 |

In the example of Table 1, wireless network information may include latitude/longitude information and WiFi network information. According to an embodiment, the scanning module 430 may be configured to scan cellular network information. For example, the geofencing module 410 may obtain or estimate latitude/longitude information based on cellular network information received from the scanning module 430. According to an embodiment, the scanning module 430 may obtain WiFi network information through WiFi scanning. For example, the WiFi network information may include BSSID that is identification information of an access point (e.g., the second external electronic device 221), RSSI indicating the strength of a received signal from the corresponding access point, and a channel index indicating an operation channel of the corresponding access point. For example, the WiFi network information may include information about at least one access point detected by the electronic device 101.

According to an embodiment, the geofencing module 410 may transmit information obtained from the scanning module 430 and information obtained from the payment module 420 to the geofencing server 302. For example, when information is obtained or received from the scanning module 430 and the payment module 420, the geofencing module 410 may transmit payment information and wireless scanning information to the geofencing server 302. For another example, the geofencing module 410 may transmit, to the geofencing server 302, the wireless scanning information and payment information, which are obtained, received, or accumulated during a specified period. For another example, when payment information and wireless scanning information having the specified number are received, obtained, or accumulated, the geofencing module 410 may transmit the accumulated payment information and wireless scanning information to the geofencing server 302.

According to an embodiment, the geofencing module 410 may obtain the payment information from the text extraction module 440. For example, the payment authorization statements received from some financial companies (e.g., a credit card issuer) may be used by only the payment module 420 due to security issues. For example, the payment authorization statement may not include information (e.g., a store name) associated with the identification of a place where a payment has been made. According to an embodiment, the geofencing module 410 may obtain the payment information from the text extraction module 440.

According to an embodiment, the text extraction module 440 may extract the payment information from a payment authorization statement of a short message service (SMS) and/or multimedia message service (MMS), and may deliver the extracted payment information to the geofencing module 410. According to an embodiment, the payment module 420 may deliver the payment information extracted by the text extraction module 440 to the geofencing module 410. According to an embodiment, the text extraction module 440 may extract the payment information from payment-related information displayed on a display (e.g., the display 360 of FIG. 3). For example, the text extraction module 440 may extract payment information based on a user's consent. According to an embodiment, the electronic device 101 may provide a user interface for receiving the user's consent, on the display 360.

According to an embodiment, the geofencing module 410 may receive payment information from the text extraction module 440 or the payment module 420 based on information associated with a payment means (e.g., a credit card) used to make a payment. For example, some credit card issuers may not transmit payment information including a store name to the payment module 420. The geofencing module 410 may receive the payment information from the text extraction module 440 or the payment module 420 depending on the credit card issuer associated with a credit card.

According to an embodiment, the geofencing module 410 may receive the payment information from the text extraction module 440 or the payment module 420 based on the payment location. For example, it is impossible to use the payment information (e.g., for legal reasons) in some countries. According to an embodiment, the geofencing module 410 may receive the payment information in different schemes based on a country where the electronic device 101 has been placed when making a payment. For example, the geofencing module 410 may receive the payment information from the text extraction module 440 or the payment module 420 depending on the payment country. For example, in the case of a country where the payment information is legally available, the geofencing module 410 may be configured to receive the payment information from the payment module 420; in the case of a country where the payment information is not legally available, the geofencing module 410 may be configured to receive the payment information from the text extraction module 440.

According to an embodiment, the electronic device 101 may generate the payment information based on information obtained from the payment module 420 and the text extraction module 440. For example, the payment statement received from a payment server by the payment module 420 may include only information about the time of making a payment. The electronic device 101 may generate the payment information, using both information received by the payment module 420 and information obtained by the text extraction module 440.

According to an embodiment, the geofencing module 410 may make a request for interest location information to the geofencing server 302 and may receive the interest location information including a wireless fingerprint from the geofencing server 302. The geofencing module 410 may determine whether the electronic device 101 is adjacent to a specific interest location, based at least on the wireless network information obtained by the scanning module 430 and the received wireless fingerprint. Besides, the geofencing module 410 may provide various services (e.g., a location-based service) based on the proximity to the interest location of the electronic device 101. For example, when the electronic device 101 is located to be adjacent to a specific store, the geofencing module 410 may execute an application associated with the specific store (e.g., a membership application associated with the specific store).

According to various embodiments, the geofencing server 302 may generate the interest location information based on the payment information and the wireless network information (e.g., wireless scanning information) received from various electronic devices (e.g., the electronic device 101). According to an embodiment, the geofencing server 302 may transmit the interest location information to the electronic device 101. For example, the geofencing server 302 may transmit the interest location information in response to a request from the electronic device 101. For another example, the geofencing server 302 may transmit the interest location information to the electronic device 101 as a push message based on a specified condition.

The interest location management module 460 may process information (e.g., payment information and wireless network information) received from an external electronic device (e.g., the electronic device 101) (e.g., generating interest location information), and may transmit the interest location information to an external electronic device.

According to an embodiment, the interest location management module 460 may generate the interest location information based on an identifier for a specific location. For example, the interest location management module 460 may extract identification information (e.g., a store name) associated with a payment place from the payment information received from the electronic device 101, and may match the identifier based on the extracted identification information with a specific location. The interest location management module 460 may generate wireless fingerprint information based on the identifier and wireless network information (e.g., wireless scanning information) based on the identifier. The interest location management module 460 may generate the interest location information by matching the identifier and a wireless fingerprint and may store the generated interest location information in the interest location database 480. Table 2 below is an example of the interest location information capable of being generated by the interest location management module 460.

TABLE 2

| Interest location index | Store name | Wireless fingerprint |
| --- | --- | --- |
| 1 | A | Fingerprint 1 |
| 2 | B | Fingerprint 2 |

The geofencing server 302 may store statistical information based on the wireless fingerprints collected from various external electronic devices (e.g., the electronic device 101). For example, the list (e.g., BSSID) of WiFi access points measured in connection with a specific store name and the received signal strength (e.g., RSSI) for each WiFi access point may be different for each measurement electronic device. According to various embodiments, the geofencing server 302 may store statistical information of a wireless fingerprint associated with each interest location, and may transmit the stored statistical information to the electronic device 101. According to an embodiment, the electronic device 101 (e.g., the geofencing module 410) may accurately determine the proximity to the interest location, based on the statistical information. For example, the statistical information may include at least one of a) the cumulative number of reports, b) information associated with the minimum and/or maximum received signal strength, and c) the average and/or variance of the received signal strength for each access point associated with a store name. According to an embodiment, the geofencing server 402 may store the statistical information mapped to the interest location information together with the interest location information in the interest location database 480.

For example, Table 3 below is an example of a wireless fingerprint capable of being generated by the interest location management module 460.

TABLE 3

| | | WiFi information | | |
| --- | --- | --- | --- | --- |
| Latitude/ longitude | BSSID | RSSI average | RSSI variance | CHANNEL INDEX |
| 37.6/126.9 | AA:BB:CC:11:22:33 | −64 dBm | 3.9 | 41 |
| | AA:BB:CC:77:88:99 | −71 dBm | 17.7 | 57 |

In the example of Table 3, statistical values may be included in the wireless fingerprint, but the wireless fingerprint may not include at least part of the pieces of information disclosed above.

For example, even in the same store, the store name may differ depending on a financial company (e.g., a credit card issuer). For example, the name of store "A" may be registered as "A" in the first card issuer, but may be registered as "A*" in the second card issuer. Accordingly, as described above, to manage the interest location based on the store name, different store names for the same store need to be managed as a single identifier. The interest location classification module 470 may classify pieces of interest location information such that the payment information about the same store having different store names is mapped onto the same identifier. According to an embodiment, the interest location classification module 470 may determine whether different store names indicate the same store, based at least on the similarity of the store name and/or the similarity of wireless network information. The interest location classification module 470 may classify pieces of interest location information depending on the store name and may store the classified interest location information in the interest location database 480. For example, when wireless network information about the pre-generated interest location information is received from the electronic device 101, the interest location classification module 470 may update wireless fingerprint and/or statistical information of the corresponding interest location information.

For example, when a single access point has a plurality of identifiers (e.g., BSSID), geofencing accuracy may be reduced due to the plurality of identifiers. According to an embodiment, the geofencing server 302 may reduce error probability and overhead by generating a wireless fingerprint for the only representative identifier among a plurality of identifiers at the same place (e.g., the physically identical access point).

According to an embodiment, the interest location classification module 470 may determine whether a plurality of identifiers are associated with the same access point, depending on specified conditions. According to an embodiment, the first condition includes a case where two BSSIDs, each of which is composed of the hexadecimal number of 12 digits, have the same value of 9 or more digits among the 12 digits. For example, when the first BSSID is '11:22:33:AA:BB:CC' and the second BSSID is '10:22:33:AA:BB:CC', only the value of one digit is different, and thus the first BSSID and the second BSSID satisfy the first condition. According to an embodiment, the second condition includes a case where the difference in the RSSI value between two identifiers is not greater than a specified range (e.g., 3 dB). According to an embodiment, the third condition includes a case where each of two identifiers operates in the same channel. When two identifiers operate in different channels (e.g., when the two identifiers operate simultaneously in the 2.4 GHz and 5 GHz bands, or the like), not only the electric wave features of each channel are different, but also signal strength may be different, and thus it may be considered that there are substantially two access points. According to an embodiment, when the first, second, and third conditions described above are satisfied, the interest location classification module 470 may determine that the access points associated with different identifiers are physically the same access point. In this case, the interest location classification module 470 may select a representative identifier for the same access point, and may store or update the interest location information based on the representative selector in the interest location database 480.

In the above-described embodiments, it has been described that the determination of the same access point and/or the same store (e.g., when a plurality of store names are used) is performed by the interest location classification module 470. However, at least part of the functions of the above-described interest location classification module 470 may be performed by the electronic device 101. For example, as described above, the geofencing module 410 of the electronic device 101 may process the wireless network information and/or payment information depending on the operations of the interest location classification module 470 to transmit the processed result to the geofencing server 302.

As described above, the geofencing module 410 needs to obtain information about a plurality of wireless networks (e.g., a cellular network, a WiFi network, a Bluetooth network, an NFC network, and/or other wireless networks) as wireless network information. Hereinafter, the structure of the geofencing module 410 will be described with reference to FIG. 5.

FIG. 5 illustrates structures 501 and 502 of a geofencing module according to various embodiments.

Returning to FIG. 3, the electronic device 101 may include the communication circuit 390 performing a function associated with wireless and/or wired communication. For example, the communication circuit 390 may include at least one communication processor (CP). For example, the communication processor performs functions associated with cellular communication; WiFi communication may be performed by a separate WiFi module. Also, the electronic device 101 may include the processor 120 performing various functions such as an operating system, an application, or the like. For example, the processor 120 may include an application processor (AP).

Referring to FIG. 5, in reference numeral 501, according to various embodiments, an application processor (e.g., the processor 120) of an electronic device (e.g., the electronic device 101 in FIG. 3) may control a WiFi module 592, and a communication processor (e.g., the communication circuit 390) may control a cellular module 593. For example, the application processor may have higher power consumption than the communication processor. According to an embodiment, the electronic device 101 may perform coarse-grained geofencing, using a geofencing CP module 591 located in the communication processor; only when fine-grained geofencing is required, the electronic device 101 may perform geofencing, using a geofencing AP module 521 in the application processor. For example, the geofencing CP module 593 may perform geofencing (e.g., determining the proximity to the interest location) based on cellular network information from the cellular module 593. For another example, the geofencing AP module 521 may perform geofencing based on WiFi network information (and/or the cellular network information received from the cellular module 593) received from the WiFi module 592. For example, the electronic device 101 may reduce the power consumption by performing geofencing based on AP and/or CP depending on a precision.

Referring to reference number 502, according to various embodiments, a communication processor (e.g., the communication circuit 390) of the electronic device 101 may obtain information of the WiFi module 592 through a sensor hub 594. According to an embodiment, the communication processor may perform geofencing based on WiFi network information and/or cellular network information, by providing information about the WiFi module 592 to the communication processor. For example, only when an event occurs (e.g., when the electronic device is located to be adjacent to a specified interest location), the communication processor (e.g., the geofencing CP module 591) may call the application processor (e.g., the geofencing AP module 521). In this case, because most of the operations of the geofencing module (e.g., the geofencing module 410 of FIG. 4) other than the execution of an application may be performed by the geofencing CP module 591, the power consumption may be reduced.

In the above, structures of each of the configurations of the geofencing system have been described with reference to FIGS. 4 and 5. Returning to FIG. 3, the third external electronic device 304 (e.g., a payment server) of FIG. 3 may store and manage information of a payment means (e.g., a credit card) associated with the electronic device 101. In addition, the third external electronic device 304 may receive a payment authorization statement from a financial company (e.g., a credit card issuer) and may transmit the payment authorization statement to the electronic device 101. Hereinafter, the structure of the payment system will be described with reference to FIG. 6.

Figure 6:
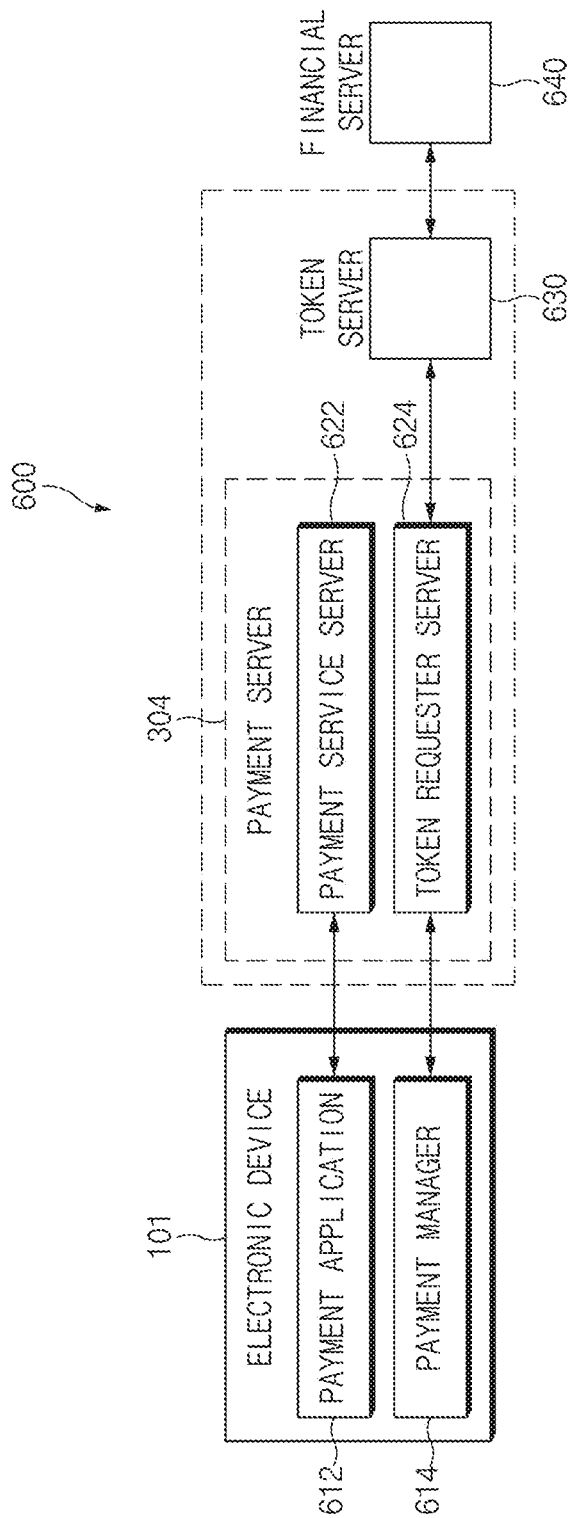
FIG. 6 illustrates a payment system according to various embodiments.

FIG. 6 illustrates a payment system 600 according to various embodiments.

According to various embodiments, the payment system 600 may include the electronic device 101 and/or a server. In addition, for example, the server may include the payment server 304, a token server (or token service provider) 630, or a financial server (issuer) 640. For example, the electronic device 101 may include a payment application (wallet application) 612 and/or a payment manager 614. For example, the payment server 304 may include a payment service server 622 and/or a token requester server (token requester) 624.

According to various embodiments, the payment application 612 may include the payment application 612 (e.g., Samsung Pay™ Application). For example, the payment application 612 may provide a user interface (e.g., user interface (UI) or user experience (UX)) associated with a payment. The user interface associated with a payment may include a wallet user interface (wallet UI/UX). For example, the payment application 612 may provide a user interface associated with card registration, payment, or transaction. The payment application 612 may provide an interface associated with the card registration through, for example, a text reader (e.g., optical character reader/recognition (OCR)) or an external input (e.g., a user input). Moreover, the payment application 612 may provide, for example, an interface associated with user authentication through identification and verification (ID&V).

According to various embodiments, the payment application 612 may perform a payment transaction, using the payment application 612. For example, the payment application 612 may provide a payment function to the user through the execution of Simple Pay, Quick Pay, or a specified application. The user may perform a payment function, using the payment application 612 and may receive information associated with the payment function.

According to various embodiments, the payment manager 614 may include information associated with a card issuer. For example, the payment manager 614 may include the software development kit (SDK) of a card issuer.

According to various embodiments, the payment server 304 may include a management server for an electronic payment or a mobile payment. For example, the payment server 304 may receive information associated with a payment from the electronic device 101 and may transmit the information to the outside or process the information in the payment server 304.

According to various embodiments, the payment server 304 may transmit and receive information between the electronic device 101 and the token server 630, using the payment service server 622 and/or the token requester server 624. For example, the payment service server 622 may include the payment server (e.g., Samsung payment server) 304. For example, the payment service server 622 may manage card information associated with a service account (e.g., Samsung account) or a user account. Further, the payment service server 622 may include an application program interface (API) server associated with the payment application 612. Besides, the payment service server 622 may provide, for example, an account management module (e.g., account integration or Samsung account integration).

According to various embodiments, the token requester server 624 may provide an interface for processing the information associated with a payment. For example, the token requester server 624 may issue, delete, or activate the information (e.g., a token) associated with a payment. Alternatively, the token requester server 624 may be operatively connected to the payment manager 614 to control information required for the payment.

According to various embodiments, the payment application 612 included in the electronic device 101 and the payment service server 622 included in the payment server 304 may be operatively connected to each other. For example, the payment application 612 may transmit and receive information associated with a payment to the payment server 304. According to an embodiment, the payment manager 614 included in the electronic device 101 and the token requester server 624 included in the payment server 304 may be operatively connected to each other. For example, the payment manager 614 may transmit and receive the information associated with a payment to and from the token requester server 624.

According to various embodiments, the token server 630 may issue the information associated with a payment (e.g., a token) or may manage the information associated with a payment. For example, the token server 630 may control the life cycle of a token, and the control of the life cycle may include a function of generation, modification, or deletion. For example, the token server 630 may include a token management server, and may perform token provisioning, ID&V, replenishment, or life cycle management. Moreover, integration of information associated with a financial server may be performed.

According to various embodiments, the payment server 304 and/or token server 630 may be located in identical or similar areas or may be located in separate areas from each other. For example, the payment server 304 may be included in the first server, and the token server 630 may be included in the second server. Furthermore, for example, the payment server 304 and/or the token server 630 may be implemented to be separated in a single server (e.g., the first server or the second server).

According to various embodiments, the financial server 640 may perform card issuance. For example, the financial server 640 may include a card-issuing bank. Besides, the information required for a payment provided to a user may be generated. The user may store the information required for a payment, which is generated by the financial server 640, in the electronic device 101 using the payment application 612. Also, the financial server 640 may be operatively connected to the token server 630 to transmit and receive the information required for a payment.

Figure 7:
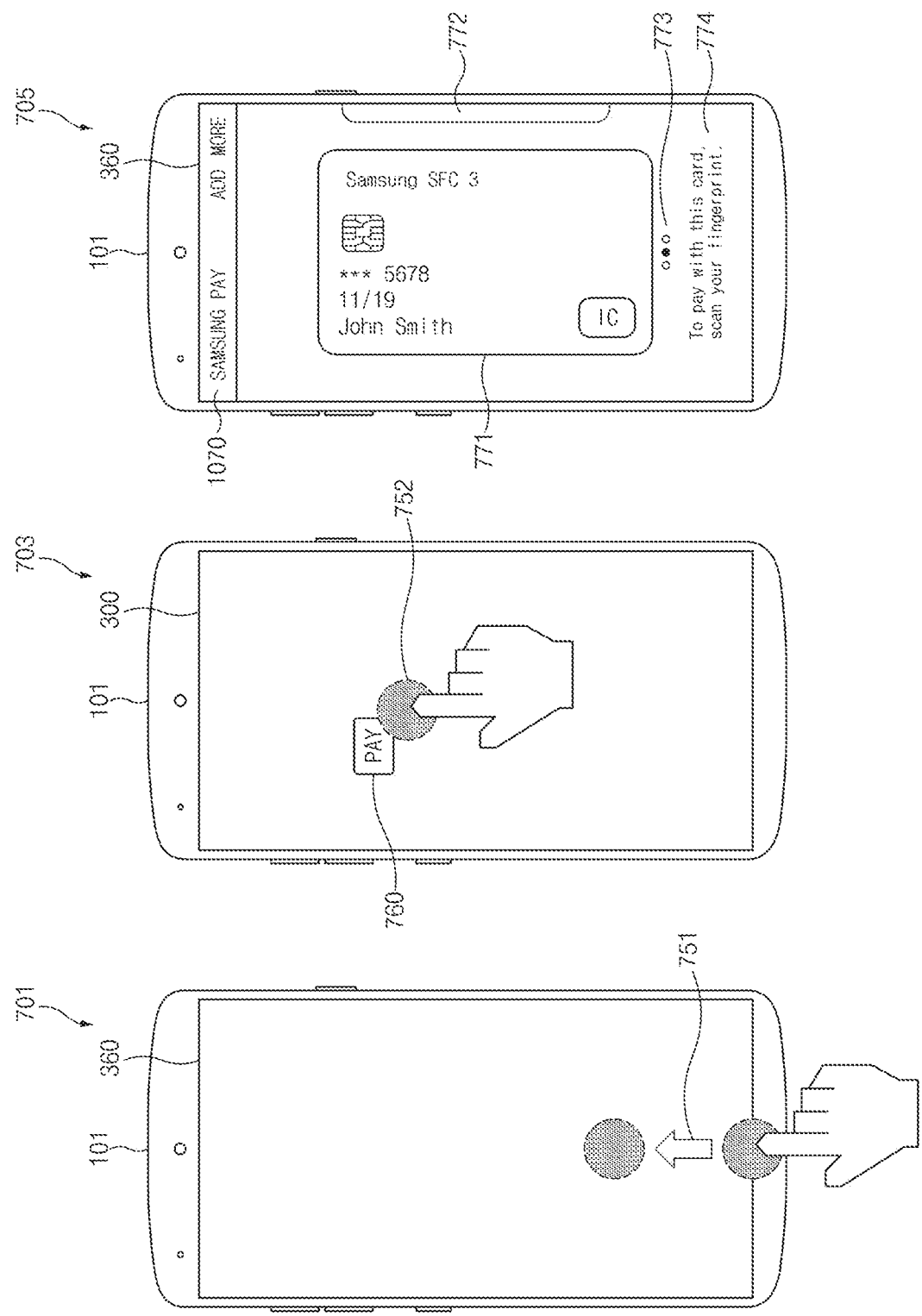
FIG. 7 illustrates a payment application call according to various embodiments.

FIG. 7 illustrates a payment application call according to various embodiments.

As described above, according to various embodiments, the electronic device 101 may perform geofencing on, for example, only an offline payment based on payment information. According to an embodiment, the electronic device 101 may determine whether the corresponding payment is an online payment or an offline payment, based on the executed payment application.

According to an embodiment, the electronic device 101 may distinguish an offline payment and an online payment based on the difference in payment processes. Referring to reference number 701 of FIG. 7, in the case of the offline payment, the electronic device 101 may execute the payment application based on a first user input 751. For example, the first user input 751 may correspond to a user input to sweep from a bezel area of the lower portion of the display 360 of the electronic device 101 to the display 360.

Referring to reference numeral 703 of FIG. 7, according to various embodiments, the electronic device 101 may display a user interface 760 for making a requesting for making a payment in a specified application, and may execute a payment application based on a second user input 752 to the user interface 760.

Referring to reference numbers 701 and 703, in the case of an offline payment, the payment process is started based on a user input (e.g., the first user input 751); on the other hand, in the case of an online payment, the user interface 760 for requiring a user input (e.g., the second user input 752) is first provided to the user. According to an embodiment, the electronic device 101 may distinguish an offline payment and an online payment based on the difference in process between the offline payment and the online payment.

Referring to reference numeral 705, according to various embodiments, the electronic device 101 may display a user interface corresponding to a payment application, on the display 360 in response to the execution of the payment application. According to an embodiment, the electronic device 101 may display a card image 771 corresponding to a representative card. In addition, when desiring to make a payment with a card corresponding to the currently displayed representative card image 771, the electronic device 101 may display a message 774 for making a request for entering biometric information, on the display 360. Besides, a partial image 772 of another card may be displayed on the right or left side of the display 360. The electronic device 101 may further display an indicator 774 indicating the location of the currently-displayed card and whether other registered cards are present. For example, the electronic device 101 may provide the user with the presence of another card and the direction for selecting another card, through the partial image 772 and/or the indicator 774. According to an embodiment, the electronic device 101 may display another card corresponding to the user input as a representative card image on the display 360 based on the user input (e.g., a swipe/drag input to the left or right side of the display 360) having the directivity.

Figure 8:
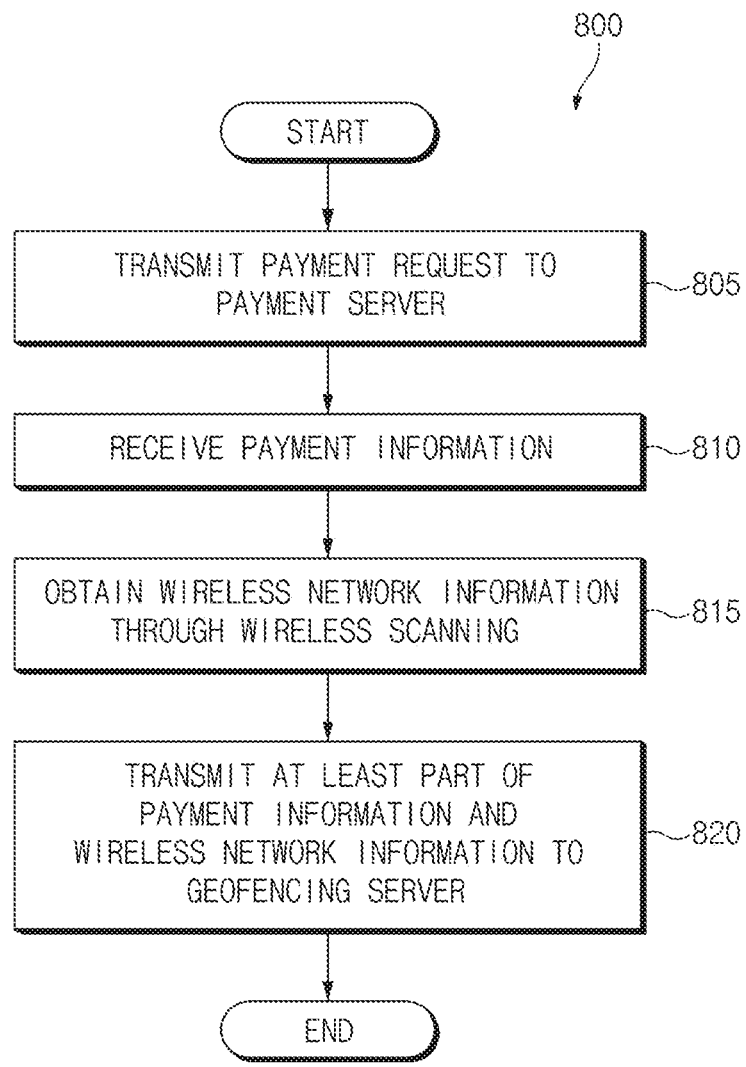
FIG. 8 is a flowchart of a method for transmitting location information according to various embodiments.

FIG. 8 is a flowchart of a method 800 for transmitting location information according to various embodiments.

In operation 805, according to various embodiments, the processor 120 of the electronic device (e.g., the electronic device 101 of FIG. 3) may transmit a payment request to a payment server (e.g., the third external electronic device 304), using the communication circuit 390.

In operation 810, according to various embodiments, the processor 120 may receive payment information including store name information associated with at least a payment from a payment server, using the communication circuit 390. For example, the payment information may be received through a push notification or a push message. For another example, the payment information may be received through SMS or MMS.

In operation 815, when the payment information is received, the processor 120 may obtain wireless network information through wireless scanning. For example, the processor 120 may obtain WiFi network information by performing WiFi scanning using the communication circuit 390. For another example, the processor 120 may obtain cellular network information by scanning a cellular network.

In operation 820, the processor 120 may transmit information associated with at least part (e.g., a store name) of payment information, and information associated with at least one access point to a geofencing server (e.g., the first external device 302 in FIG. 3). For example, when obtaining the payment information and the information associated with at least one access point, the processor 120 may perform the transmission to the geofencing server 302. For another example, the processor 120 may perform the transmission to the geofencing server 302 based on a specified period or an amount of data. According to an embodiment, the processor 120 may transmit at least part of the payment information and at least part of wireless network information to the geofencing server 302. For example, the wireless network information may include information associated with at least one access point and location information estimated by the processor 120 or the communication circuit 390 based on cellular network information.

In the embodiment of FIG. 8, because the electronic device 101 transmits the wireless network information together with the payment information, the geofencing server 302 may perform automated geofencing. In addition, because the electronic device 101 transmits only the information excluding personal information from the payment information, personal information may be protected.

In the embodiment of FIG. 8, as described above with respect to FIG. 5, operation 815 and operation 820 may be performed by the communication circuit 390.

Figure 9:
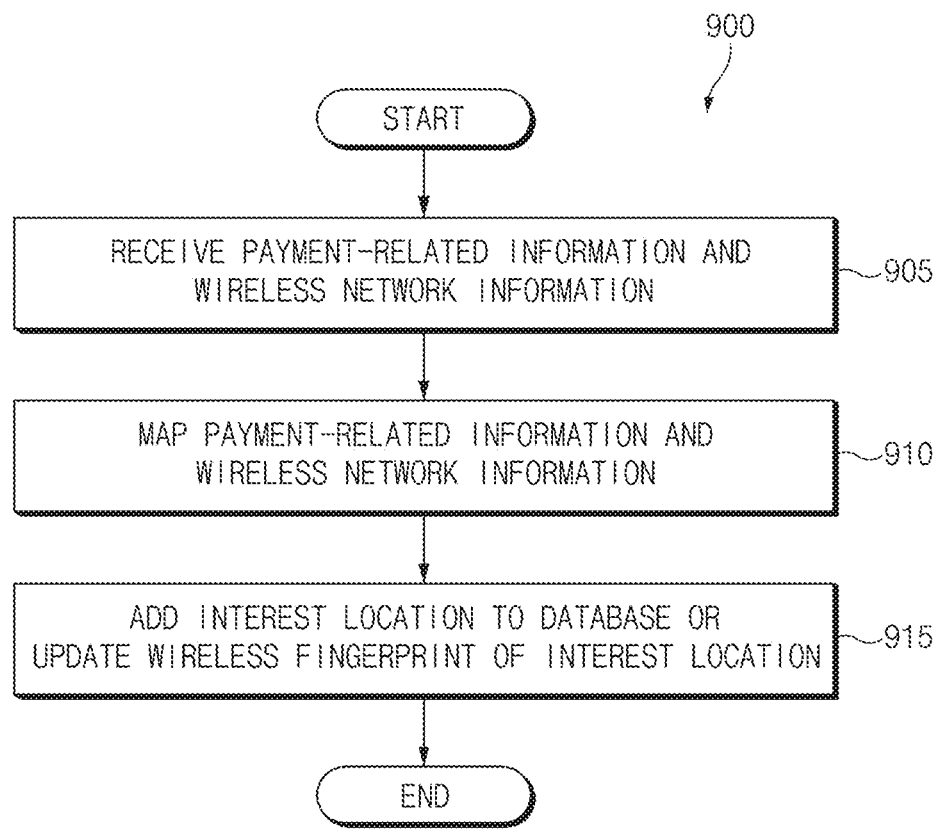
FIG. 9 is a flowchart of a method for generating a interest location database according to various embodiments.

FIG. 9 is a flowchart of a method 900 for generating an interest location database according to various embodiments.

In operation 905, according to various embodiments, the geofencing server (e.g., the first external electronic device 302 in FIG. 3) may receive payment-related information (e.g., a store name, a payment amount, and/or a payment dates) and wireless network information from the electronic device (e.g., the electronic device 101). According to an embodiment, the wireless network information may include information about at least one access point (e.g., an identifier, a channel index, and/or received signal strength information) and/or location information (e.g., latitude and longitude) estimated based on a cellular network.

In operation 910, according to various embodiments, the geofencing server 302 may map the payment information and the wireless network information. According to an embodiment, as described above with reference to FIG. 4, the geofencing server 302 may perform data processing in the various manners to map the payment information and the wireless network information.

In operation 815, according to various embodiments, the geofencing server 302 may add an interest location to a database based on the mapping of payment information and wireless network information, or may update the wireless fingerprint of the interest location corresponding to the mapping.

As described above, the geofencing server 302 may store statistical information associated with a wireless fingerprint in interest location information, together. According to an embodiment, the geofencing server 302 may provide an improved location-based service by transmitting interest location information to the electronic device 101 based on a request or a specified condition.

Figure 10:
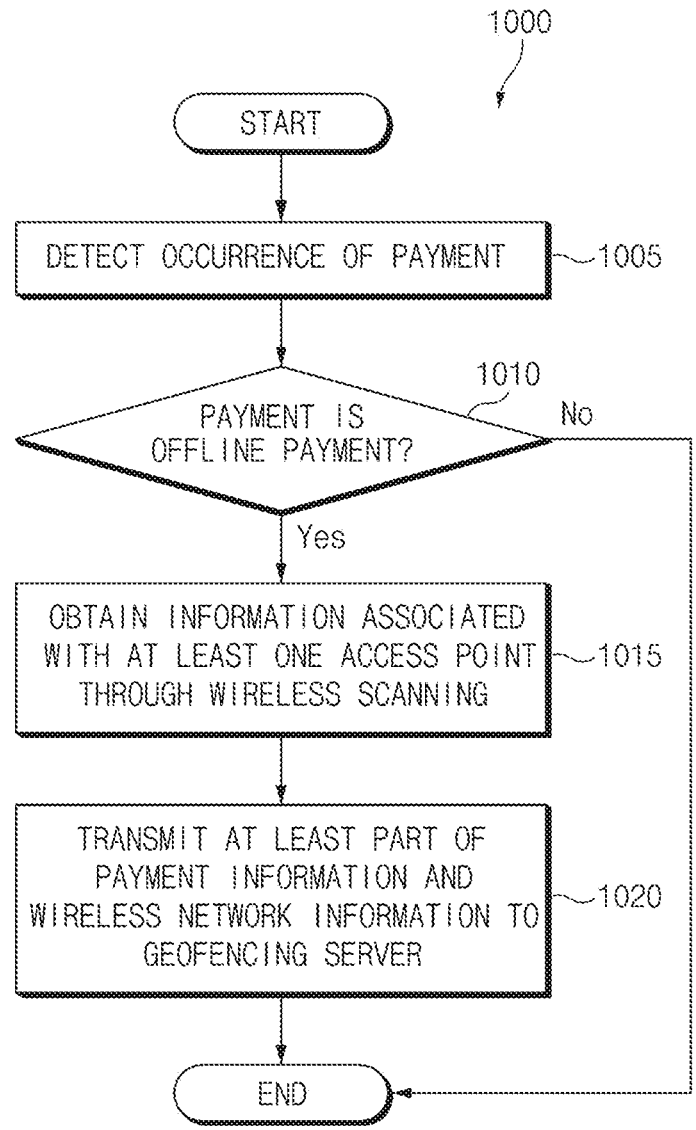
FIG. 10 is a flowchart of a method for transmitting location information according to various embodiments.

FIG. 10 is a flowchart of a method 1000 for transmitting location information according to various embodiments.

In operation 1005, according to various embodiments, a processor (e.g., the processor 120) of an electronic device (e.g., the electronic device 101 of FIG. 3) may detect the occurrence of a payment. For example, the processor 120 may detect the occurrence of a payment by receiving a payment authorization statement from a payment server (e.g., the third external electronic device 304).

In operation 1010, the processor 120 may determine whether a payment is an offline payment. For example, the processor 120 may determine the offline payment based on at least one of whether a short-range communication circuit 391 (e.g., an MST module or an NFC module) is used, a payment process, and internal information of the processor 120. When the payment is the offline payment, the processor 120 may perform operation 1015. The descriptions of operation 1015 and operation 1020 may be referenced by the descriptions of operation 915 and operation 920.

The operations of the electronic device 101 described above with reference to FIGS. 8, 9, and 10 are exemplary, and the above-described operations may be combined with the operation of the electronic device 101 described above in connection with FIGS. 1 to 7.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one communication circuit;
   a short-range communication circuit;
   a display; and
   a processor connected with the at least one communication circuit, the short-range communication circuit and the display, wherein the processor is configured to:
      perform a transaction with a point-of-sale (POS) device using the short-range communication circuit;
      receive information associated with the transaction from a payment server;
      extract POS information comprising at least a store name from the received information;
      generate payment information at least including the store name associated with the transaction, from the received information;
      obtain at least one wireless network information, using the at least one communication circuit;

transmit the obtained at least one wireless network information and the payment information to a geofence server;

receive interest location information from the geofence server, using the at least one communication circuit, wherein the interest location information includes an identifier based on the store name and at least one wireless fingerprint associated with the identifier; and execute at least one application based on a location associated with the interest location information, by comparing the interest location information with the at least one wireless network information.

2. The electronic device of claim 1, wherein the processor is configured to:

when the information associated with the transaction is received, obtain the at least one wireless network information.

3. The electronic device of claim 1, wherein the processor is configured to:

when a payment based on near field communication (NFC) or magnetic secure transmission (MST) is made, obtain the at least one wireless network information.

4. The electronic device of claim 1, wherein the processor is configured to:

generate the payment information by excluding information capable of identifying a user of the electronic device or a payment means associated with the transaction from the information associated with the transaction.

5. The electronic device of claim 1, wherein the processor is configured to:

receive the information associated with the transaction from the payment server, using at least one of a push notification, a push message, a short message service (SMS), or a multimedia message service (MMS).

6. The electronic device of claim 1, wherein the at least one wireless network information includes at least one of a network identifier, signal reception strength, channel information, or location information estimated from a network.

7. The electronic device of claim 1, wherein the processor is configured to:

obtain the at least one wireless network information by performing wireless scanning.

8. The electronic device of claim 1, wherein the at least one wireless fingerprint includes a network identifier, average received signal strength information, and variance information of received signal strength.

9. A data transmitting method of an electronic device, the method comprising:

performing, by a processor using a short-range communication circuit, a transaction with a point-of-sale (POS) device;

receiving, by the processor, information associated with the transaction from a payment server;

extracting, by the processor, POS information comprising at least a store name from the received information;

generating, by the processor, payment information at least including the store name associated with the transaction, from the received information;

obtaining, by the processor using at least one communication circuit, at least one wireless network information associated with the electronic device;

transmitting, by the processor, the obtained at least one wireless network information and the payment information to a geofence server;

receiving, by the processor using the at least one communication circuit and from the geofence server, interest location information, wherein the interest location information includes an identifier based on the store name and at least one wireless fingerprint associated with the identifier; and executing, by the processor, at least one application based on a location associated with the interest location information, by comparing the interest location information with the at least one wireless network information.

10. The method of claim 9, wherein the obtaining of the at least one wireless network information is performed in response to reception of the information associated with the transaction.

11. The method of claim 9, wherein the performing the transaction with the POS device comprises performing the transaction, by the processor, using NFC or MST, wherein the obtaining of the at least one wireless network information is performed in response to the transaction using the NFC or the MST.

12. The method of claim 9, wherein the generating of the payment information includes:

excluding, by the processor, information capable of identifying a user of the electronic device or a payment means associated with the transaction from the information associated with the transaction.

13. The method of claim 9, wherein the receiving of the information associated with the transaction includes:

receiving, by the processor, the information associated with the transaction from the payment server, using at least one of a push notification, a push message, an SMS, or an MMS.

* * * * *